April 23, 1940. C. G. VOKES 2,198,189
FILTER
Filed Oct. 6, 1937 2 Sheets-Sheet 1

INVENTOR
Cecil G. Vokes
BY
ATTORNEY

April 23, 1940.  C. G. VOKES  2,198,189
FILTER
Filed Oct. 6, 1937  2 Sheets-Sheet 2

INVENTOR
Cecil G. Vokes
BY
ATTORNEY

Patented Apr. 23, 1940

2,198,189

UNITED STATES PATENT OFFICE 2,198,189

FILTER

Cecil Gordon Vokes, London, England

Application October 6, 1937, Serial No. 167,654
In Great Britain October 9, 1936

5 Claims. (Cl. 183—10)

This invention relates to filters.

An object of the invention is to provide a filter in which a periodical reversal or interchange of the positioning of appropriate parts automatically ensures that the filtering medium is kept clean by means of a liquid cleaning agent.

In one typical form, part of the filtering media can be cleansed by means of oil or other suitable liquid whilst another part is being used for filtration and means are provided whereby these parts can be interchanged. In this way, each part of the media can, alternately, be used, for filtration and be cleansed by means of the liquid.

Thus a series of frames containing filtering media may be housed in a casing with the lower halves immersed in liquid and the upper halves used for filtration. The frames are mounted so as to be reversible in the casing to bring the cleaned halves into the upper part of the casing.

Other component parts of the filter may be interchanged or reversed so as to bring the filter elements and a receptacle containing the cleansing liquid into alternative positions relatively to one another whenever the cleansing action of the liquid has ceased to keep effective the operative area of the filter elements.

Various objects and advantages of the invention will be apparent from the description of the preferred embodiment which will be described with reference to the accompanying drawings, the novel features being pointed out in the appended claims.

Figure 1:
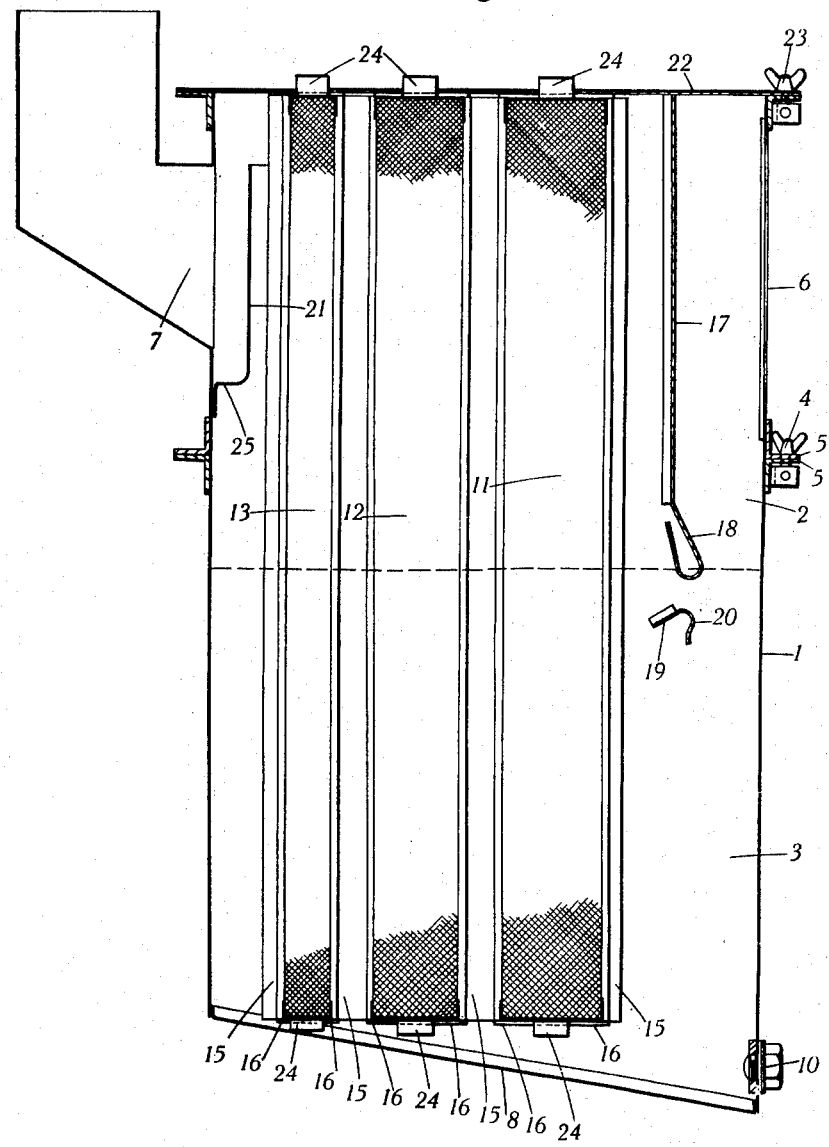
Fig. 1 is a cross-section of a filter in accordance with the invention.
Figure 2:
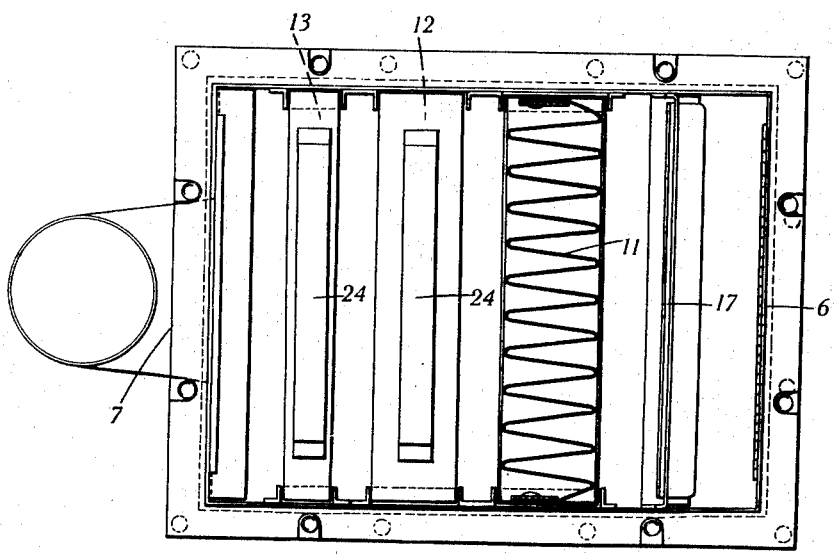
Fig. 2 is a plan view, with the cover removed.

In this preferred form of filter device, a casing 1 is provided comprising an upper portion forming a filter chamber 2 and a lower portion of substantially the same height forming an oil tank 3. These two portions are connected together by quick-release bolts 4 passing through abutting flanges 5, 5' on the two parts.

The casing 1 is substantially rectangular in plan. One side of the filter chamber 2 is provided with an opening 6 covered with expanded metal or like material to permit of the entry of air or the like to the chamber and an outlet 7 for the filtered air is provided in the opposite side of the chamber. The bottom 8 of the casing 1 is inclined somewhat to the horizontal and a draining outlet, normally closed by a screwed plug 10, is provided at the lowest part of the casing.

Frames 11, 12, 13 containing filtering material extend completely across the casing 1 so that air in passing from the inlet 6 to the outlet 7 passes through the frames 11, 12, 13 in succession. The frames are of different efficiencies, that with the minimum efficiency, 11, being nearest to the inlet 6 and the filtering efficiency increasing as the outlet 7 is approached. Handles 24 are provided at each end of the frames.

The filtering material in each frame is finer than that in the preceding one so that the filtering efficiency (that is the fineness of material which can be arrested) progressively increases from the inlet to the outlet. The filtering material is in pleated form and the depth of the pleat in the different frames decreases progressively so that the surface of the filtering material also progressively decreases.

These frames 11, 12, 13, are supported in guides fixed at each side of the casing 1. These guides are formed by L-shaped section iron 15 welded to the sides of the casing 1 so that the frames 11, 12, 13 may slide easily within them, and stops 16 on which the frames rest are provided at the bottom of the guides.

Extending across the top half 2 of the casing in front of the first filter frame 11 is a deflecting plate 17, the lower edge of which is arranged to come slightly more than half-way down the casing. The lower edge of the deflector plate is formed with a curl 18 to decrease its resistance to air streaming past it. A strip 19 is mounted immediately below the lower edge of the plate 17, so that a gap is left between the lower edge of the plate 17 and the strip 19. The strip 19 is fixed at each end to the sides of the casing and its edge is bent round to form a curl 20.

A baffle plate 21 extends across the casing in front of the outlet 7 and is spaced therefrom to form an oil trap. The baffle is fixed at one edge to the wall of the casing and then extends first outwardly from the wall and then upwardly. An aperture 25 is formed in the outwardly extending part of the plate to return oil caught in the trap to the tank.

A readily detachable lid 22, fastened with quick-release bolts 23 closes the top of the casing 1 in an airtight manner. Slots are cut in the lid to enable the handles of the filter elements to protrude and these slots are sealed by the contact of the filter elements with the underside of the lid.

The lower half 3 of the casing 1 is filled with oil so that at least half of each frame 11, 12, 13 is immersed in the oil. The level of the oil is arranged to be a short distance above the lower edge of the plate 17.

Air entering the filter chamber 2 through the louvres 6 is directed downwardly by the deflecting plate 17, splashes through the oil and then passes through the space between the lower edge 18 of the deflecting plate and the strip 19. It then passes through the filtering material contained in the successive frames 11, 12, 13 and the clean air passes out through the outlet passage 7. Oil carried by the air is deposited in the trap formed by the plate 21 and passes through the aperture 25 to the tank.

The filtering material in the lower half of the frames 11, 12, 13 is, meanwhile, cleaned by the oil, the dirt falling to the bottom of the casing as a sludge. Settling trays (not shown) may be provided for the sludge.

When it is desired to present cleansed filtering material to the incoming air, the lid 22 is removed and the frames 11, 12, 13 slid out of their guides 14, reversed and replaced in the guides. The filtering material which was previously at the top of the casing is thereby immersed in the oil which cleanses it.

Sludge may be removed at intervals by removing the bottom half of the casing, draining the oil therefrom and tipping out the sludge.

The filtering material in the successive stages may be similar, the different capacities being obtained by varying the thickness of the material or different kinds of filtering material may be used in the different frames.

I claim:

1. A filter comprising a casing having an upper portion defining a filtering area and a lower portion defining a cleansing receptacle, the filtering area being formed with an inlet and an outlet and the cleansing receptacle containing a cleansing fluid, guides carried by the walls of the casing extending substantially throughout the height of the filtering area and cleansing receptacle, with the guides arranged in spaced relation, and filtering elements slidable in the guides from the top of the receptacle, such filtering elements having a length to bridge the filtering area and substantially bridge the cleansing receptacle, the filtering elements when in position in the guides presenting relatively fixed elements, the upper portions of which traverse the filtering area and the lower portions of which are seated in the cleansing fluid in the cleansing receptacle, means for holding the filtering elements in the guides against casual separation, the filtering elements being movable longitudinally of the guides to free the elements and provide for reversal of the elements and repositioning in the guides in a reverse position to arrange that portion of each filtering element previously traversing the filtering area within the cleansing fluid and that portion of the filtering element previously in the cleansing fluid in a position transverse the filtering area, whereby any one or more of the filtering elements may at will be reversed from a particular position in the casing to permit cleaning of a portion of the element while at the same time permitting the remaining portion of the element to serve as a filtering agent.

2. A construction as defined in claim 1, wherein the means for holding the filtering elements against casual displacement includes a cover removably secured to the upper end of the casing, with said cover formed with apertures to receive projections on the filtering elements when the latter are in operative positions within the guides.

3. A construction as defined in claim 1, wherein a baffle plate is interposed in the filtering area of the casing between the inlet and the first filtering element with the lower end of said plate extending into the cleansing fluid in the cleansing receptacle.

4. A construction as defined in claim 1, wherein a plurality of filtering elements are arranged in the casing with the respective filtering elements of a filtering capacity varying from the initial element to the final element.

5. A construction as defined in claim 1, including a baffle plate arranged between the inlet to the filtering area and the initial filtering element, said baffle plate extending into the cleansing fluid in the cleansing receptacle, and means arranged immediately below that end of the baffle plate within the cleansing fluid to direct the incoming medium to be filtered upwardly toward the filtering area after passing around the immersed end of the baffle plate.

CECIL GORDON VOKES.